Feb. 24, 1925.
M. C. GARLICK
1,527,511
ELECTRICAL SWITCHING APPARATUS
Filed Oct. 29, 1923  2 Sheets-Sheet 2
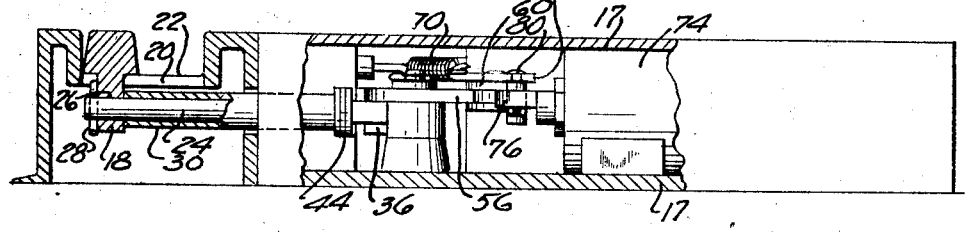
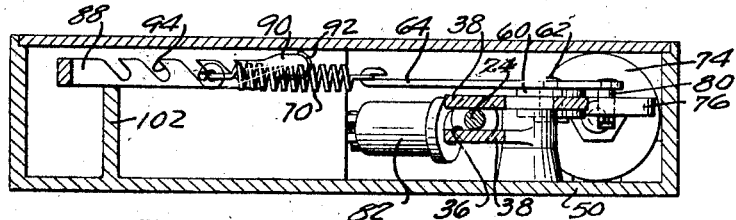
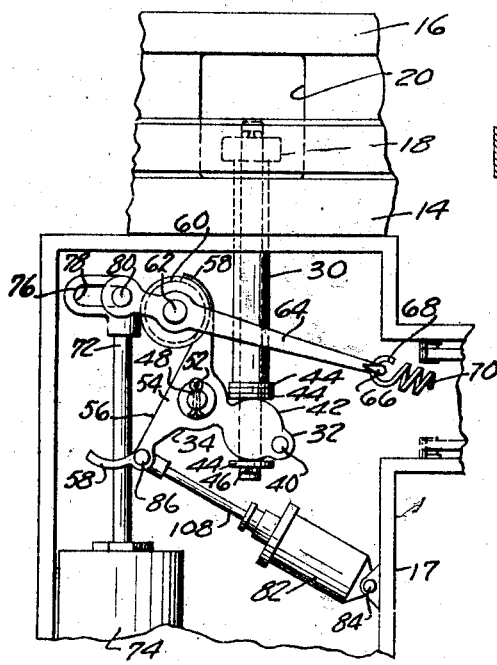
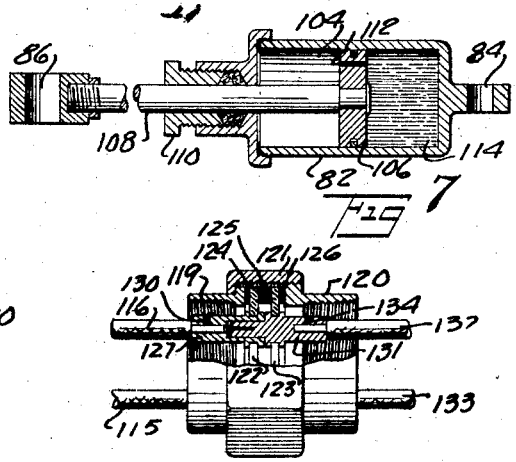
INVENTOR
Maurice C. Garlick.
BY
H. H. Dyke
ATTORNEY Patented Feb. 24, 1925.

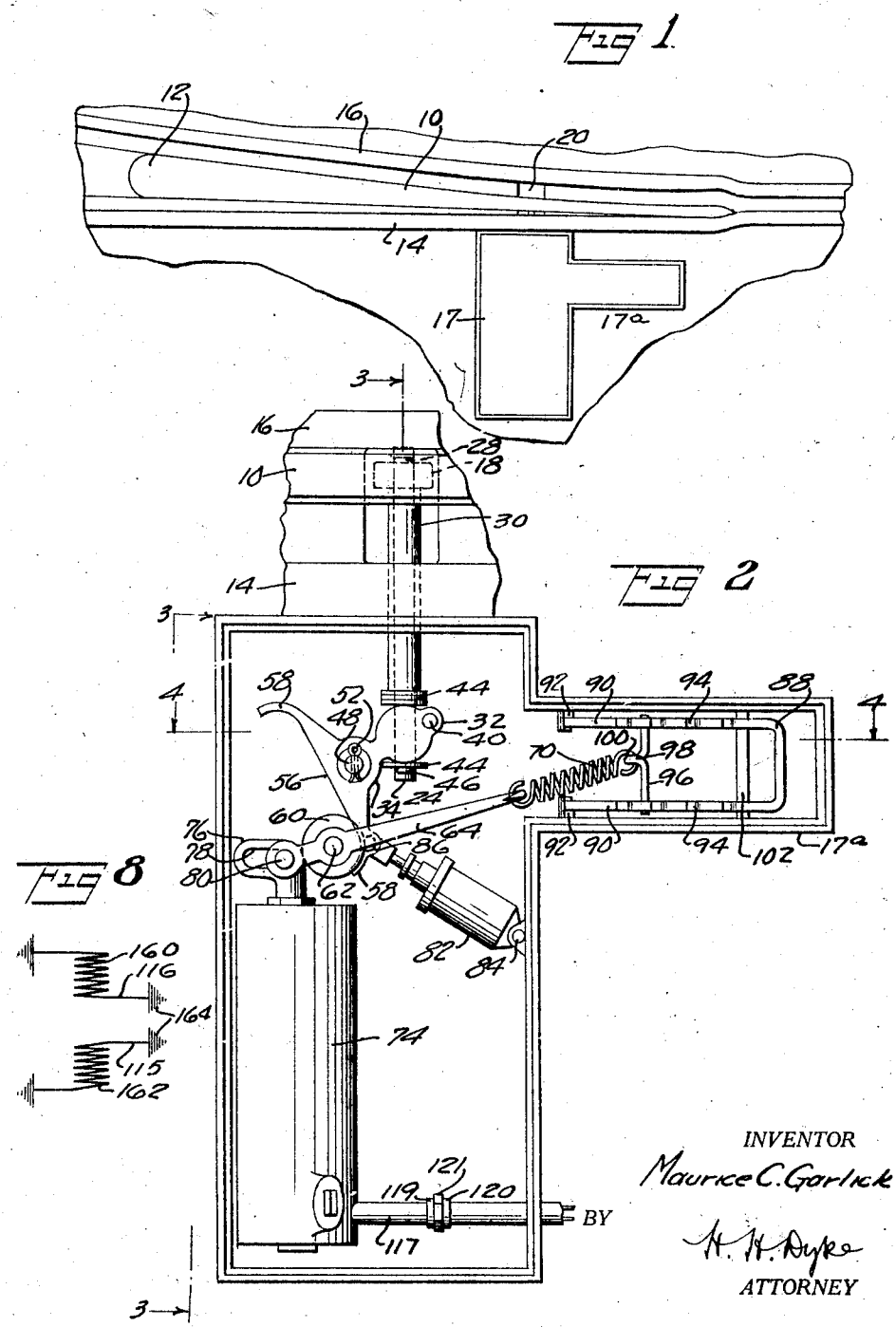

1,527,511

UNITED STATES PATENT OFFICE.

MAURICE C. GARLICK, OF EASTON, PENNSYLVANIA.

ELECTRICAL SWITCHING APPARATUS.

Application filed October 29, 1923. Serial No. 671,515.

*To all whom it may concern:*

Be it known that I, MAURICE C. GARLICK, a citizen of the United States, and a resident of Easton, county of Northampton, and State of Pennsylvania, have invented new and useful Improvements in Electrical Switching Apparatus, of which the following is a specification.

My invention relates to an improvement in electrically operated switch mechanism. Switching apparatus of the present invention derives the power for its actuation from an electrically operated member or members adapted to supply a power stroke in two opposite directions, as, for example, the power may be derived from a double acting solenoid, that is to say, a solenoid apparatus comprising a core and a pair of actuating coils therefor, so arranged that when current is passed through one coil the core is projected outwardly and when current is passed through the other coil the solenoid coil is retracted, but other double acting electrically operated power supplying devices may be utilized, if desired.

A variety of control devices and electrical circuit arrangements are well known and in common use for securing such elective movement of the core of a double acting solenoid or equivalent electrical device, and for this reason a detailed showing of such well known part of the apparatus has not been included in my drawings, it being understood that any means may be made use of under the control of the motorman, whereby upon coming to a certain portion of the trolley, third rail or the like, properly constructed and arranged for the purpose, the motorman is able at will to complete a circuit which will cause the solenoid coil or its equivalent to make a power stroke in either direction.

The present invention is more particularly concerned with the devices for utilizing the power stroke obtained as described for causing a corresponding movement of the pivoted switch tongue, which it is desired to operate, and the purpose of the invention consists in the provision of novel apparatus for this purpose, which comprises an adjustable pull or expansion spring and is of simple character, efficient in operation, readily assembled, not readily gotten out of order, and which can be readily removed or taken down in whole or in part by labor which is relatively unskilled as compared with skilled labor ordinarily required for this purpose, and with a minimum of trouble and a minimum of interruption of traffic.

Further objects of the invention will appear in connection with the description of the preferred embodiment of the invention which is shown in the accompanying drawings, and which it is to be understood is intended only for the purpose of illustration and for affording an understanding of the invention and not for the purpose of imposing limitations upon the invention.

In the said drawings, Fig. 1 is a small scale plan view of a switch with a box for containing the switch control apparatus located alongside thereof. Fig. 2 is a partial plan view on enlarged scale with the box cover removed to show the working parts. Fig. 3 is a part side and part sectional view with a part thereof broken away and the sectional part being taken on line 3—3, Fig. 2. Fig. 4 is a section on line 4—4, Fig. 2. Fig. 5 is a view similar to a portion of Fig. 2, but with the parts in a different position from that of Fig. 2. Fig. 6 is a longitudinal sectional detail view of a form of dash pot preferably made use of. Fig. 7 is a side view with parts broken away of an electrical plug or coupling. Fig. 8 is a partial wiring diagram for a double acting solenoid.

Reference character 10 designates the switch tongue pivoted at 12 between the switch rails 14, 16. Alongside of the switch rails there is provided a box or casing 17 for receiving the switch actuating parts hereinafter referred to. A lug 18 projects downwardly from the lower side of the switch tongue 10 and extends through and below a slot 20 formed in the switch base 22.

A readily removable push and pull operating device is applied to said downwardly projecting lug 18. In the form shown the rod 24 extends through an opening 26 in the lug 18 and is provided therebeyond with a readily removable pull imparting device such as cotter pin 28. Such rod 24 serves to impart pulling movement to the switch tongue 10 and said rod 24 is surrounded by the distance sleeve 30, which is interposed between the adjacent side of lug 18 of switch tongue 10 and the arm 32 of the oscillatory lever 34.

The connection between arm 32 of lever 34 and switch tongue 10 and the rod 24 and sleeve 30 is of such nature that same may be readily adjusted and readily taken apart, and so that turning movement of lever 34 will result in endwise movement of rod 24 in sleeve 30. In the form shown the rod 24 is passed through slot 36 provided between the two lips 38, 38 of said lever arm 32, and said rod 24 is prevented from getting out of such slot by the pin 40 passed through extensions of such lips 38, 38 as shown in Fig. 5. The part of arm 32 of lever 34 which coacts with rod 24 and sleeve 30 is preferably made round or substantially so in horizontal section, as indicated at 42, Fig. 5, and adjustability is secured by the provision of a plurality of washers 44, 44 held in place by a cotter pin 46 passed through this end of the rod 24. It will be evident that by using washers of varying thickness and by changing the number and positions of the washers substantially any desired adjustment may be secured between these parts.

Lever 34 is pivoted at substantially the center thereof on the stud 48 extending upwardly from the floor 50 of the casing 17 and is held in place thereon by the cotter pin 52. The arm 54 of lever 34 opposite arm 32 thereof is provided with a preferably straight trackway 56 terminating in stop horns 58, 58 and adapted to receive and limit the movement of the flanged anti-friction wheel 60 on said trackway 56. The anti-friction wheel 60 is pivotally mounted at 62 in a floating link member 64 which has a hook 66 at one end for attachment to the hook 68 of pull or expansion spring 70, and at its opposite end is pivotally and slidably connected to the plunger 72, which forms or comprises an extension of the core of the double acting power member, as a solenoid 74. The spring 70 exerts pull on lever 34 through engagement of roller 60 therewith. In the form shown the pivotal and slidable connection between these parts is provided by forming said plunger 72 with a lateral extension 76 having an elongated slot 78 therein, and pin 80 is passed through said slot 78 and through a hole provided therefor in the link 64.

A dash pot 82 is preferably provided for slowing down the final movement of the switch tongue and same may be pivotally connected between the casing 17 and the lever 34 as by being pivoted at 84 to casing 17 and at 86 to lever 34.

The pull or expansion spring 70 is preferably located in an extension 17ª of casing 17, and is so constructed and mounted that the spring and its carrying device can be readily removed or replaced. The mounting for spring 70 comprises the yoke 88, the arms 90, 90 whereof are rounded at their ends and received in rounded seats in the lugs 92, 92, which project inwardly from and are preferably formed integral with the walls of the casing extension 17ª. Said yoke 88 has a plurality of pairs of undercut notches 94, 94 provided in the upper side thereof and said notches are adapted to receive and retain a crossbar 96, which is preferably curled or twisted between its ends as shown at 98, in order to enable the adjacent hook ends 100 of spring 70 to be hooked therein. Stop rib or the like 102 is provided in the casing member 17ª for limiting the downward movement of said yoke 88 and same is so arranged that when yoke 88 is at the downward limit of its movement the yoke connection of spring 70 to crossbar 96 is below the pivotal supports of the arms 90, 90 of yoke 88 in the casing 92, 92.

It will be seen that by raising the yoke on its pivot ends crossbar 96 can be engaged with any desired pair of notches 94 in order to give the desired tension and that upon depression of yoke 88 the spring 70 is both stretched and held in position and there is no tendency of the yoke 88 to rise because of the pivotal attachment of spring 70 therewith passing below a dead center with respect to the pivoting points 92, 92 of yoke 88.

The dash pot 82 preferably comprises a cylinder 104, a piston 106 and the piston rod 108 passing through the gland 110. Said piston 106 has one or more perforations 112 through which the fluid 114, such as oil or the like with which the cylinder is partially filled, may pass relatively slowly toward the end of the stroke in either direction of the piston 106, thus permitting a relatively rapid first movement of piston rod 108 and connected parts, which is followed by a relatively slower final or closing movement of these parts.

It is of special importance in apparatus of this character that the electrical connections shall be securely held after being made and at the same time that the parts may be readily separated for repairs, etc., and special provision has been made to this end by passing the coil wires 115, 116 for the double acting solenoid 74 out through the pipe 117, making use of an ordinary pipe coupling wherein the electrical connecting plug or the like may be located and protected, and yet be readily accessible by merely opening up the parts of the ordinary pipe coupling. This pipe coupling comprises the two coupling members 119, 120, and the customary threaded coupling sleeve 121. A pair of insulating disks 122, 123 are adapted to be received within the sleeve 121 between the coupling members 119 and 120, and rubber or other insulating rings 124, 125 and 126 are provided on the outer sides of said disks 122 and 123 and between the same respectively. The female portion of the plug is mounted in the disk 122 and comprises a pair of headed sleeves 127, 127 inserted through openings in the disk 122 and having the wires 115 and 116 secured in place therein as by means of set screws 130, 130. For the male portion of the plug the disk 123 has the plug pins 131, 131 secured in place therein, and the wires 132 and 133 are secured in place therein as by means of set screws 134, 134. It will be seen that when the parts just described are assembled and the coupling sleeve 131 screwed in place, there is no strain on the electric plugging parts and there is no tendency for them to separate, and yet by merely unscrewing the coupling sleeve 121 complete access can be had to all the parts of the electrical connecting device. Other forms of electric plugs may, of course, be used, but the one described, which has been designed and constructed particularly for use in connection with the other parts of the apparatus described herein, is preferable.

Where a double acting solenoid is employed the partial wiring diagram of Fig. 8 is preferably made use of, wire 116 leading to coil 160 and the wire 115 to coil 162, and both of the coils may be conveniently grounded within the casing, as indicated at 164, the casing 17 being secured to the rail 14 in any desired way in order to obtain a good grounding connection.

The operation of the apparatus is as follows: the motorman making use of the well known electrical connection and apparatus for this purpose operates the device by completing the circuit either by wire 115 or 116 to the ground. We will first assume that upon current being passed through wire 116, the plunger 72 is projected from the solenoid 74. This moves the parts from the position shown in Fig. 2 to that of Fig. 5, which results in throwing the switch tongue 10 against switch rail 14. It will be understood, of course, that the actuation of plunger 72 by the solenoid is substantially momentary, but same is sufficient to carry the wheel 60 past dead center position with respect to lever 34 and that the contractile pull imposed thereon by the stretching of the spring 70 in the first part of the movement of lever 34 will result in forcing the wheel 60 to complete its entire stroke to the position shown in Fig. 5, where it rests against the stop member 58 located in the side toward the switch.

In the reverse actuation, the operation is altogether similar. Solenoid 72, being retracted by current passing through coil 162, is pulled from the position of Fig. 5 away from the switch rail and toward the position of Fig. 2 and at the same time spring 70 is put under tension. If the movement of the switch tongue is not completed through the action of the solenoid, as it may be if the period of current passage through the solenoid coil is sufficiently long, same will be caused by the pull of spring 70 to complete its movement to the opposite stop member 58 of lever 34 and to complete the turning of lever 34 into the position of Fig. 2. If there should be a lack of proper adjustment between the lever 34 and the parts connecting it to the rail 10, same can be eliminated by simple changes in the arrangement and size of the washers 44, 44.

It will be seen from the illustrative embodiment described that the invention affords a simple, reliable and readily replaceable means for operating a switch from any form of double throw actuating member, such as a double throw solenoid or equivalent device.

I claim:

1. In an electrically operated switch, a pivoted switch tongue, an oscillatory lever having one arm connected to the switch tongue and having a roller trackway on the other arm, a double throw electromagnetic member, a link operatively connected at one end thereof with said member, a roller on the link and adapted to travel the trackway, and a spring secured to the opposite end of the link.

2. In an electrically operated switch, a pivoted switch tongue, an oscillator lever having an arm connected to the switch tongue and having a roller trackway on the other arm, a link, a roller on said link adapted to travel said trackway, and a double throw electromagnetic member adapted to impart movement to the roller through said link and thereby oscillate the lever and actuate the switch tongue.

3. In switch operating mechanism, a double throw power member, a double throw switch actuating member, and means for imparting movement from the first member to the second member comprising a floating link connected to the first member and a lever connected to the second member.

4. In switch operating mechanism, double throw power member, a double throw switch actuating member, a lever having an arm connected to the second member, an endwise spring retracted link having means of lost-motion and moving-past-dead-center connection with the other arm of the lever, whereby the spring pull on the link is communicated through to the switch to lock it in either position, and means for imparting movement from the first member to the link.

5. In switch operating mechanism, a double throw power member, a double throw switch actuating member, a lever having an arm connected to the second member, a third floating spring retracted member having limited-movement, spring-reaction engagement with the other arm of the lever, and means for imparting movement from the first member to the third member.

6. In an electrically operated switch, a pivoted switch tongue, an oscillatory lever, adjustable means for connecting an arm of said lever to the switch tongue, a trackway on the other arm of said lever, a link having a roller thereon to travel on the trackway, a double throw electromagnetic member having a slidable connection with one end of said link, and an adjustably mounted pull or expansion spring connected with the opposite end of said link.

7. In an electrically operated switch, a pivoted switch tongue, an oscillatory lever, adjustable means of connection between one arm of the lever and switch tongue, a trackway on the other arm of the lever, and means for actuating the lever comprising a double throw electromagnetic member, a spring adapted to be tensioned at substantially a right angle to the path of movement of said electromagnetic member, a link for connecting said electromagnetic member and spring together, and a roller adapted to engage said lever trackway.

8. In an electrically operated switch, a pivoted switch tongue, a double throw electromagnetic member, and means comprising an oscillatory lever having a trackway, a link having a roller thereon adapted to travel said trackway, and a spring connected to said link adapted to pass dead center with respect to said lever for imparting double throw movement to the switch tongue and for holding the switch resiliently against the rail on either side thereof.

9. In an electrically operated switch, switch rails, a switch tongue pivoted therebetween, a double throw electromagnetic member having movement toward and away from the switch rails, an oscillatory lever having a trackway on one arm extending in the same general direction as the path of movement of said member, adjustable means for making a push and pull connection between the opposite lever arm and the switch tongue, a link having at one end a laterally slidable connection with said electromagnetic member, a pivoted yoke having a plurality of pairs of slots in its upper face, a cross-bar adapted to be received in any pair of said slots, a pull spring having one end connected to said cross-bar and the other end connected to the remaining end of said link, and an anti-friction member on said link adapted to travel the trackway and actuate said lever and thereby the switch tongue, the spring serving to assure completion of lever and switch tongue movement and to hold the switch tongue resiliently against the rail on either side thereof.

In testimony whereof, I have signed my name hereto.

MAURICE C. GARLICK.